(12) United States Patent
Acosta

(10) Patent No.: US 6,496,520 B1
(45) Date of Patent: Dec. 17, 2002

(54) WIRELESS NETWORK SYSTEM AND METHOD

(75) Inventor: Edward Acosta, Austin, TX (US)

(73) Assignee: BroadCloud Communications, Inc., Austin, TX (US)

(*) Notice: Subject to any disclaimer, the term of this patent is extended or adjusted under 35 U.S.C. 154(b) by 0 days.

(21) Appl. No.: 09/618,881

(22) Filed: Jul. 19, 2000

Related U.S. Application Data

(60) Provisional application No. 60/177,329, filed on Jan. 21, 2000.

(51) Int. Cl.[7] .............................. H04J 3/26; H04L 1/16
(52) U.S. Cl. ....................... 370/474; 370/242; 370/338; 714/746
(58) Field of Search ............................... 370/235, 236, 370/387, 392, 393, 469, 474, 216, 230, 241, 242, 252, 310, 328, 329, 338; 714/746, 748, 749, 750, 751

(56) References Cited

U.S. PATENT DOCUMENTS

| | | | | |
|---|---|---|---|---|
| 5,487,068 A | * | 1/1996 | Smolinske et al. | 370/428 |
| 5,677,918 A | * | 10/1997 | Tran et al. | 370/321 |
| 5,946,320 A | * | 8/1999 | Decker | 370/428 |

* cited by examiner

*Primary Examiner*—Ricky Ngo
(74) *Attorney, Agent, or Firm*—H. Dale Langley, Jr.; The Law Firm of H. Dale Langley, Jr., PC

(57) ABSTRACT

A method of communications over a network is specially adapted for improved transmission performance with reduced bandwidth requirements in communications networks which are low quality or have widely varied physical channel performance, for example, wireless networks. The method includes steps of packetizing a payload into a series of data packets, inserting header packets at the beginning, middle, and towards the end of the series, transmitting the series, together with the header packets, receiving at least some of the data packets of the series and at least one of the header packets, and sending an acknowledgement. The acknowledgement is either that all data packets and at least one header packet were received; that not all data packets were received and at least one header packet was received; or that some data packets were received, but no header packet was received. Re-transmissions of data packets and the header packet, when such packets are not received, is minimized in order to limit the number of communications necessary to deliver an entire data payload.

2 Claims, 17 Drawing Sheets

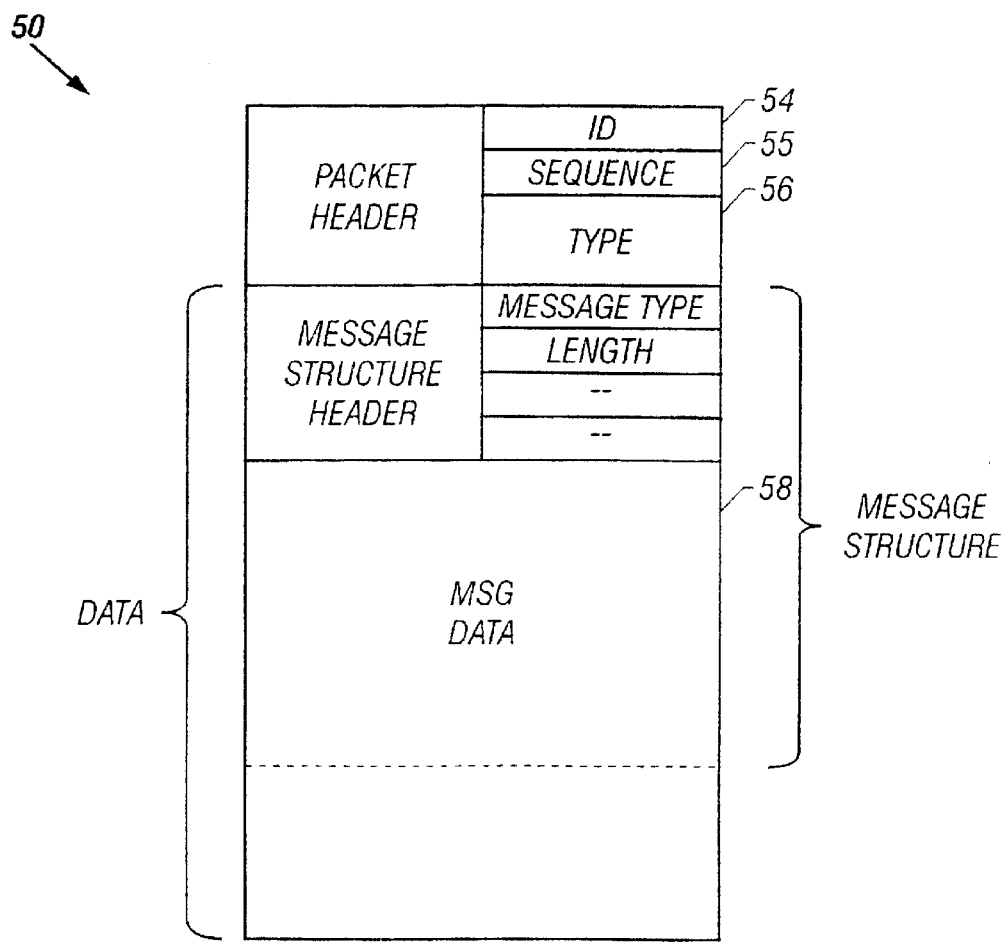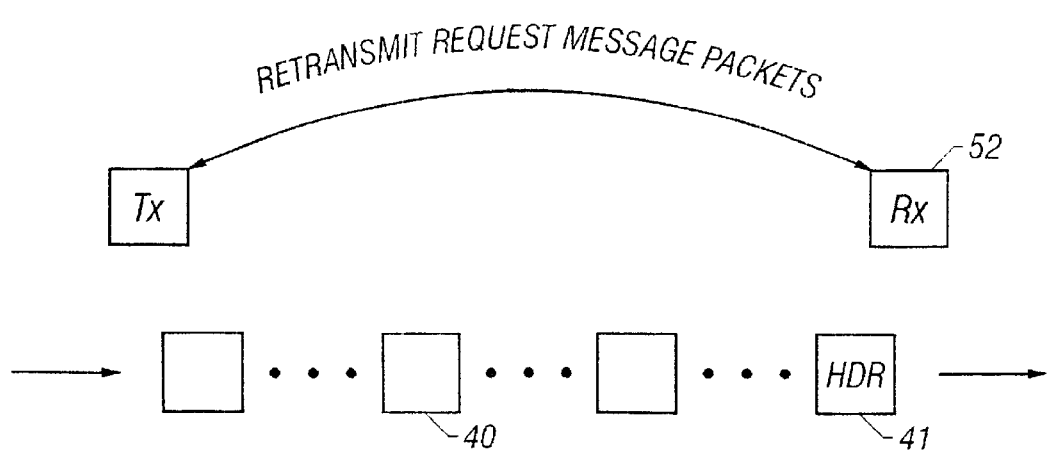
FIG. 6

FIG. 18A

| PACKET 0 "A" IMPORTANCE |
| PACKET 1 "D" IMPORTANCE |
| PACKET 2 "F" IMPORTANCE |
| ⋮ |
| PACKET N-2 "C" IMPORTANCE |
| PACKET N-1 "A" IMPORTANCE |
| PACKET N "B" IMPORTANCE |

FIG. 18B

| PACKET 0 WAS PACKET 0 "A" IMPORTANCE |
| PACKET 1 WAS PACKET N-1 "A" IMPORTANCE |
| PACKET 2 WAS PACKET N "B" IMPORTANCE |
| ⋮ |
| PACKET N-2 WAS PACKET N-2 "C" IMPORTANCE |
| PACKET N-1 WAS PACKET 1 "D" IMPORTANCE |
| PACKET N WAS PACKET 2 "F" IMPORTANCE |

FIG. 18C

| PACKET 0 WAS PACKET 0 "A" IMPORTANCE |
| PACKET 1 WAS PACKET N-1 "A" IMPORTANCE |
| PACKET 2 WAS PACKET N "B" IMPORTANCE |
| ⋮ |
| PACKET N-2 WAS PACKET N-2 "C" IMPORTANCE |
| PACKET N WAS PACKET 2 "F" IMPORTANCE |

WIRELESS NETWORK SYSTEM AND METHOD

CROSS-REFERENCE TO RELATED APPLICATION

This application is related to U.S. Provisional Patent Application No. 60/177,329 titled "Wireless Network System and Method", filed Jan. 21, 2000, co-pending herewith and which is hereby incorporated herein by this reference.

BACKGROUND OF THE INVENTION

The present invention is related generally to digital data transmission protocols in communications networks and, more particularly, is related to efficient, reliable packetized digital data transmission protocols for improved transmission performance with reduced bandwidth requirements in networks which are low quality or have widely varying physical channel performance, such as, for example, wireless network environments.

In a typical Open Systems Interconnection (OSI) reference model network protocol, several layers are defined and dictate the protocol stack. A particular OSI model protocol that is commonly used for communications networks, including the Internet, is the Internet Protocol (IP), and particularly the supplement IP known as the Transmission Control Protocol (TCP/IP). In all OSI model protocols, including IP and TCP/IP, a higher level layer, e.g., a transport protocol layer, communicates packetized data to an underlying level layer, e.g., an Internet protocol layer. Subsequently, the underlying level layer, e.g., the Internet protocol layer, eventually relays the data to a data link layer, which in turn relays the data to a physical layer, which then directs the physical transmission of the data.

For example, in such communications, first, data meant for transport by a network device is formatted according to the OSI model data protocol, containing several defined layers, such as physical layer, data link layer, network layer, transport layer, and so forth. An illustration of such an OSI model protocol is given in FIG. 1. In the model of FIG. 1, data for transmission by the device is first processed by a transport layer; this transport layer can be overlain by an application layer, specific to the particular application. Typically in the transport layer, the transport mechanisms are defined such that the data is partitioned into data packets for later physical transport.

The data from the transport layer is then processed by an interconnected network layer. An example of this network layer is the conventional Internet Protocol (IP) layer, as widely implemented today in TCP/IP networks, such as the Internet. The interconnected network layer prepares the packets from the transport protocol layer for transport across interconnected networks.

Next, the data link layer prepares the data for physical transport across a defined network physical channel, such as an Ethernet link or other type of local area network.

Finally, a physical layer performs the actual transmission of the processed data to and across the network operating under the particular OSI model implementation.

Presently, one of the most common implementations of the OSI model in network communications is TCP/IP. For example, Internet communications are typically conducted according to TCP/IP, and this is considered the standard for the Internet. In TCP/IP, the physical layer remains a constant and is independent of the devices or network, so long as the devices and network are capable of using the OSI model layers in accordance with TCP/IP.

In TCP/IP, the network layer is IP and the transport layer is TCP. IP and TCP are each well known and defined as standards. Under the standards, the IP portion of the protocol takes care of routing data packets to the intended destination. The TCP part performs integrity checks on the data and enhances reconstruction of the packets into the original message or file at the destination end.

Although TCP is presently widely used in data communications, including over the Internet, the protocol was designed primarily for use over reliable and non-variable channels and bandwidth, i.e., primarily wired connections. The shift in direction of communications to mobile and wireless devices and communications, thus, was not a premise on which the TCP protocol was defined. The premises and assumptions on which TCP was designed no longer have the same application in the wireless world and as other and newer lower quality and variable channel networks evolve.

There is, therefore, a need for improved protocols and methods that account for the characteristics of wireless and other newer physical channels and applications. A number of protocols and methods have been designed to account for and operate in particular applications, for example, voice-over IP, multimedia transport, satellite protocols, multicast protocols, and others. Although these various designs may provide certain advantages in particular applications, there continues a need for improved protocols and methods that account for wireless and similar networks that exhibit variable bandwidth and channel performance characteristics.

Particularly with wireless communications, conventional systems and methods, such as TCP/IP protocols, have several disadvantages. These disadvantages include high round trip times (RTT) of communications, variance in measurements in RTT because of channel characteristic variation, substantial packet loss, high bit error rates, false assumption that data loss because of congestion versus slow rate of sending, multichannel possibilities not anticipated, and ARQ techniques are often prohibitively expensive. Moreover, certain recent advances in technology, such as computer speeds and error correction techniques, can provide improvements, however, these advances have not previously been exploited to their potential.

In sum, there is a need for improvement in the art and technology of communications over low bandwidth, poor quality channels, such as wireless networks.

SUMMARY OF THE INVENTION

An embodiment of the invention is a method of communications over a network. The method includes the steps of packetizing a payload into a series of data packets, inserting header packets at the beginning, middle, and towards the end of the series, transmitting the series, together with the header packets, receiving at least some of the data packets of the series and at least one of the header packets, and sending an acknowledgement selected from the group consisting of: all data packets and at least one header packet received; not all data packets received and at least one header packet received; and some data packets received, but no header packet received.

In a further aspect, the method further includes the step of terminating the method if the acknowledgement is that all data packets and at least one header packet are received.

In another aspect, the method further includes the step of identifying the data packets not received if at least one header packet is received but not all data packets received. The acknowledgement of the step of sending includes identifiers of the data packets not received. The method also includes the step of re-transmitting only the data packets not received.

In a further aspect, the method includes the step of identifying that some data packets, but not any header packet, is received. The acknowledgement of the step of sending includes identifiers of the data packets received. The method also includes the steps of determining which data packets were not received, based on the identifiers in the acknowledgement and re-transmitting only the header packet and the data packets not received.

BRIEF DESCRIPTION OF THE DRAWINGS

FIG. 6 is an acknowledgement message for sending by a receiving device when a header packet has been received, according to the protocols of embodiments of the present invention.

FIGS. 18a–c are block diagrams of an exemplary interaction between a transport mechanism and a data heuristic mechanism according to embodiments of the present invention.

DETAILED DESCRIPTION OF THE INVENTION

Figure 2:
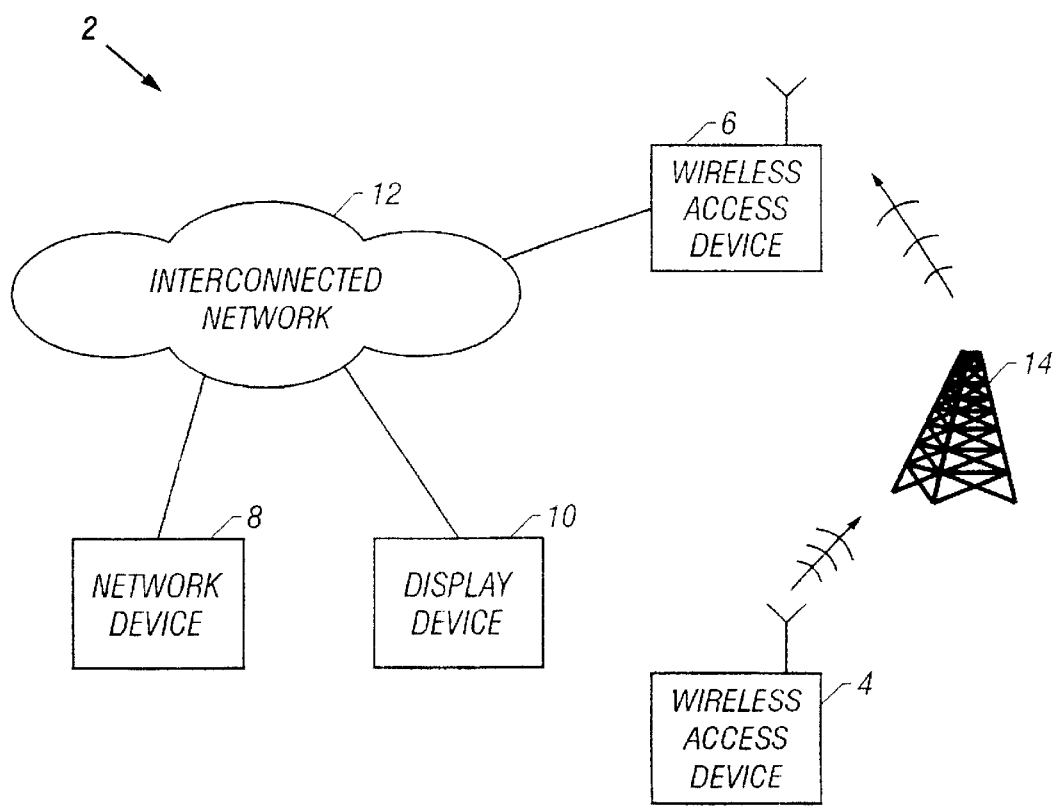
FIG. 2 is an interconnected network, including various wired and wireless connections.

FIG. 2 is a communications network 2 comprised of wireless devices 4, 6 and wired devices 8, 10. The network 2 includes interconnecting communication links 12 among the various devices 4, 6, 8, 10 and other devices and communications links (not shown). An example of the network 2 is the Internet, although other communications networks such as intranets, LANs, WANs, and others are also included as possibilities.

In the network 2, the device 8 is a network device and the device 10 is a display device. Each of these devices is connected by wire to the communication links 12 and, thus, the entire network 2. The device 4 is a mobile wireless device. The device 6 is a stationary wireless device that is connected by wire to the communication links 12. The mobile wireless device 4 and the stationary wireless device 6 are capable of wireless communications, for example, by cellular wireless transmissions and receptions via one or more cell towers 14. The mode of wireless communications is, for example, cellular digital packet data (CDPD) in a cellular wireless environment, although it could alternatively or additionally be any other wireless mode, such as analog or digital cellular, radio frequency (RF), microwave, or other.

In communications over the network 2, the mobile wireless device 4 and the stationary wireless device 6 are each capable of communicating according to specialized packetized data protocols, as follows:

Packetized Data Communications Protocols

Figure 3:
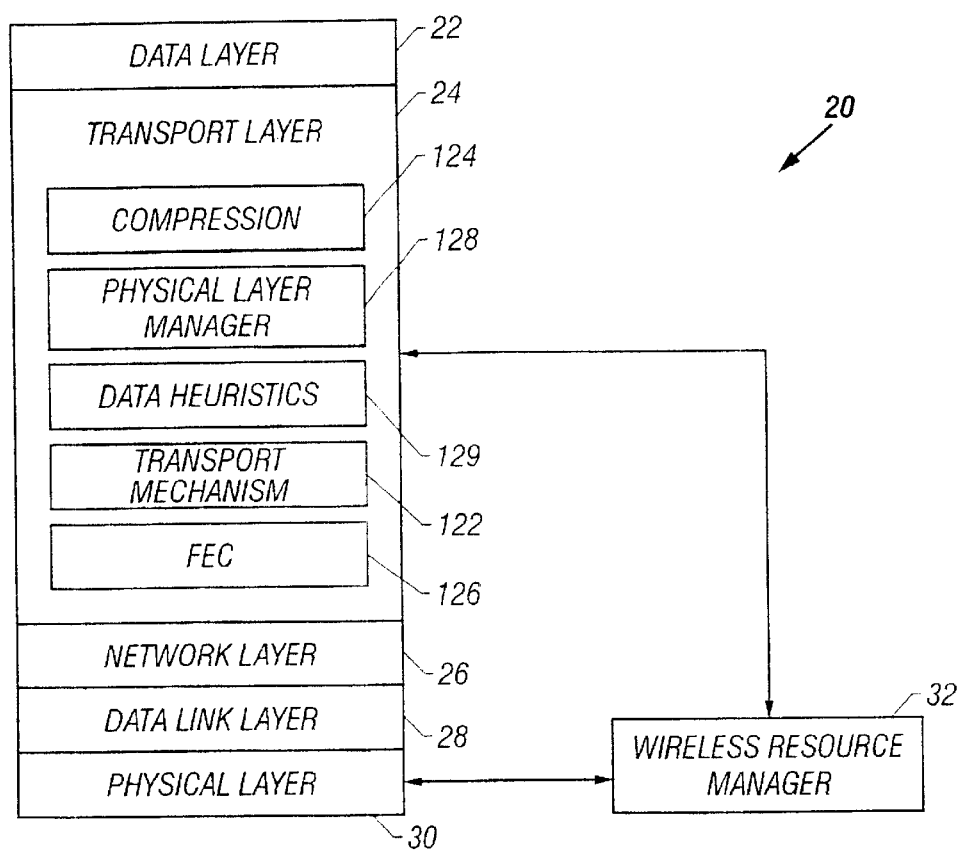
FIG. 3 is a protocol stack, according to embodiments of the present invention.

Referring to FIG. 3, the wireless devices 4, 6 (shown in FIG. 2) communicate according to an Image Transport Protocol (ITP) 20. The ITP protocol 20 conforms to the OSI model (shown in FIG. 1), but is improved for wireless and similar lower quality networks of reduced bandwidth and variable channel characteristics. The ITP protocol 20 includes various layers.

A data layer 22 provides for the transport of digital data. A transport layer 24 serves for partitioning data into desired packets. A network layer 26 prepares the packets from the transport layer 24 for transport across the particular network 2 according to its particular characteristics, for example, the particular protocol suite characteristics of the Internet or another standardized or proprietary network. A datalink layer 28 prepares the packets for physical transport across particularly defined network physical channels, i.e., dictates physical port for transport. Finally, a physical layer 30 performs the actual transmission of the packets over the particular communications channel, such as a wireless channel, of the network 2.

Although the ITP protocol 20 is, from this generalized viewpoint, somewhat similar to other OSI model protocols, certain features of the transport layer 24 and the physical layer 30 are unique. Furthermore, the ITP protocol 20 provides a wireless resource manager 32. The wireless resource manager 32 provides interaction, interconnectivitiy, and communication between the transport layer 24 and the physical layer 30 of the ITP protocol 20. These features, as well as data and packet formats, are now described.

Transmitted Data and Data Packet Formats

Figure 4:
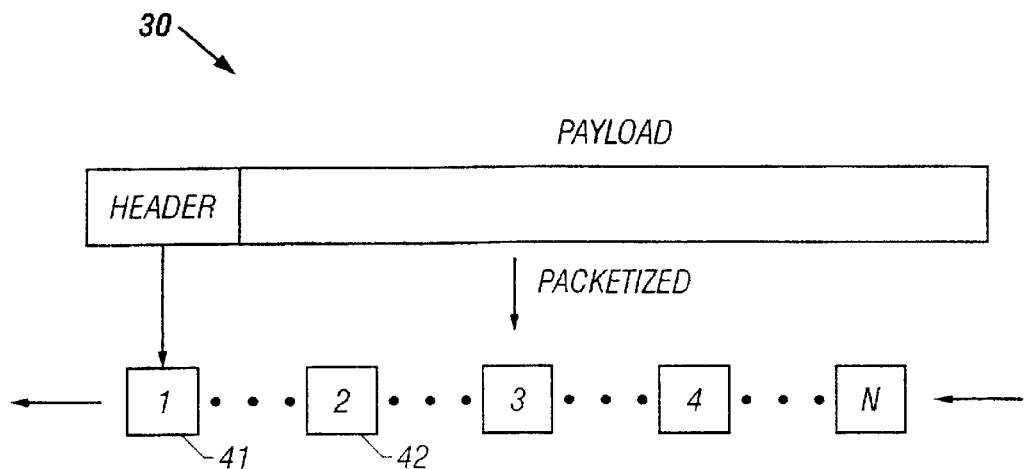
FIG. 4 is a data payload for transmission according to the protocols of embodiments of the present invention.

Referring to FIG. 4, an entire data payload 30 is split, or "packetized", into series of data packets 40. This packetization is performed in accordance with the process of the transport layer 24 of the ITP protocol 20. The transport layer 24 packetizes data in the data packets 40 having particular format. A first "in sequence" data packet 40 of the payload 30 is a header packet 41. The header packet 41 always contains a particular identifier, so-called a "payload header" or "header packet", for the payload 30 of interest. The header packet 41 is contained in the payload 30, in sequence, at the beginning of the payload 30 and also is duplicated generally in the middle of the payload 30 and within one of the last several data packets 40 at the end of the payload 30. The particular format of the data packets 40 of the payload 30 is hereafter described.

Figure 5:
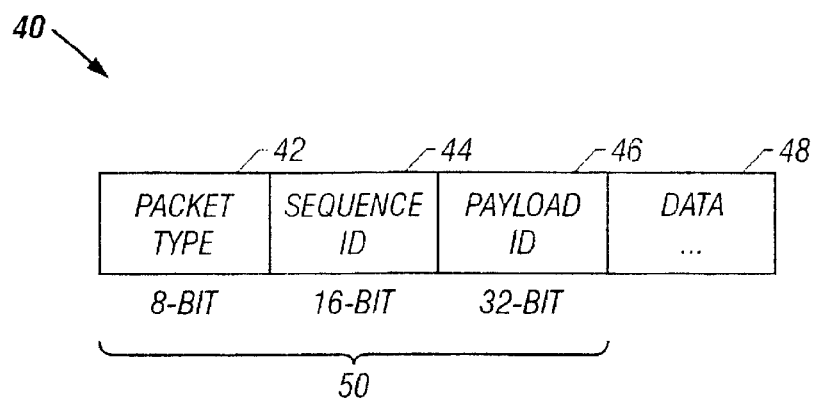
FIG. 5 is a data packet for transmission according to the protocols of embodiments of the present invention.

Referring to FIG. 5, in the ITP protocol 20, the data packet 40 for transmission includes a transmission header 50. The transmission header 50 comprises an 8-bit packet type 42, a 16-bit sequence ID 44, and a 32-bit payload ID 46. The transmission header 50 is the first sequence of information of each data packet 40 in communications according to the ITP protocol 20. The packet type 42 is employed in data type determination. The sequence ID 44 indicates the sequential location for the data packet 40 in relation to other data packets 40 (shown in FIG. 4) sent in communication of the entire payload 30 (shown in FIG. 4). The payload ID 46 serves to identify the particular payload 30 of which the particular data packet 40 is part.

Moreover, in the particular case of the header packet 41 (i.e., payload header) of the particular payload 30, the payload ID 46 identifies the header packet 41 to the particular payload 30 sent according to the ITP protocol 20. Thus, the payload ID 46 is a field that particularly identifies each certain data packet 40 with the particular payload 30. The payload ID 46, moreover, uniquely identifies the certain packet 40 when it is the header packet 41, as containing the header for the particular payload 30. The number of packets 40 in the particular payload 30 depends upon the size of the payload 30 and the size of the data packets 40.

If a packetizer breaks apart the data in a payload buffer into N packets, this number N is represented in the data field 48 of the data packet 40 which is the header packet 41 for the payload 30. Thus, the number N represented in the data field 48 of the unique header packet 41 for the payload 30 identifies the number of data packets 41 in the particular payload 30. As such, when a receiving device receives a header packet 41, the receiving device is able to determine how many packets 41 to expect from the transmission and in the particular payload 30. The header packet 41 may also contain other information, including data directly from the payload buffer and other data.

Received Data and Data Packet Formats

FIG. 6 is a block diagram of a retransmit request message packet 50 sent by a receiving device 52 in response to an incomplete payload 30 (shown in FIG. 4) reception, when the header packet 41 of the particular payload 30 has been received by the receiving device 52 but other data packets 40 have not been so received. The packet 50 contains a payload identification 54, identifying the payload 30 in question. The packet 50 additionally includes a sequence ID 55 and packet type 56 identification. A message field 58 of the packet 50 identifies that the header packet 41 of the received transmission was received by the receiving device 52. Another set of data identifies the packets 40 that the receiving device 52 did not receive and was unable to rebuild through forward error correction, or data heuristics, or similar process.

Figure 7:
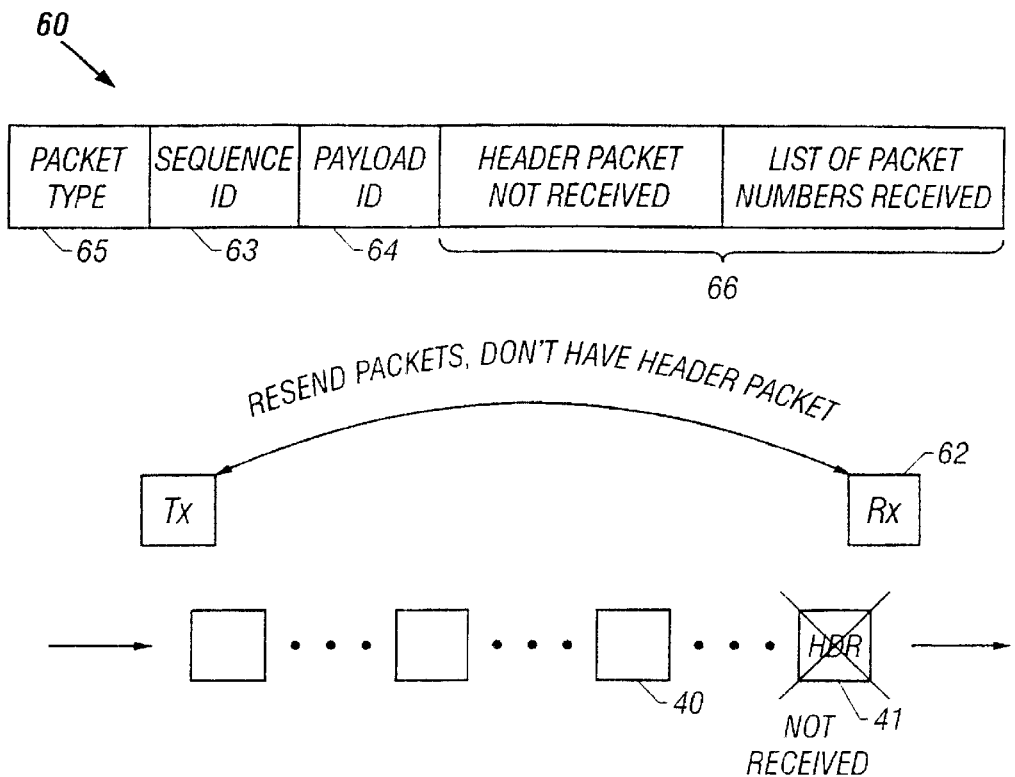
FIG. 7 is an acknowledgement message for sending by a receiving device when data packets have been received but a header packet has not been received, according to the protocols of embodiments of the present invention.

FIG. 7 is a block diagram of a resend packet 60 sent by a receiving device 62 in response to an incomplete payload 30 reception in which the header packet 41 of the particular payload 30 has not been received. The packet 60 contains a payload identification 64, identifying the payload 30 in question. The packet 62 also includes a sequence ID 63 and packet type identifier 65. A message field 66 of the packet 62 identifies that the receiving device 62 does not know how many packets 40 are in the payload 30, since the receiving device 62 did not receive the header packet 41. The resend packet 60 is sent by the receiving device 62 when a timeout is reached, after the receiving device 62 has begun to receive some data packets 40. Another block of data in the message field 62 identifies the packets 40 that the receiving device did receive, so the next transmission does not repeat those packets 40 that were received. The next transmission then resends only the header packet 41 and those packets 40 not previously received.

Wireless Resource Manager

Figure 8:
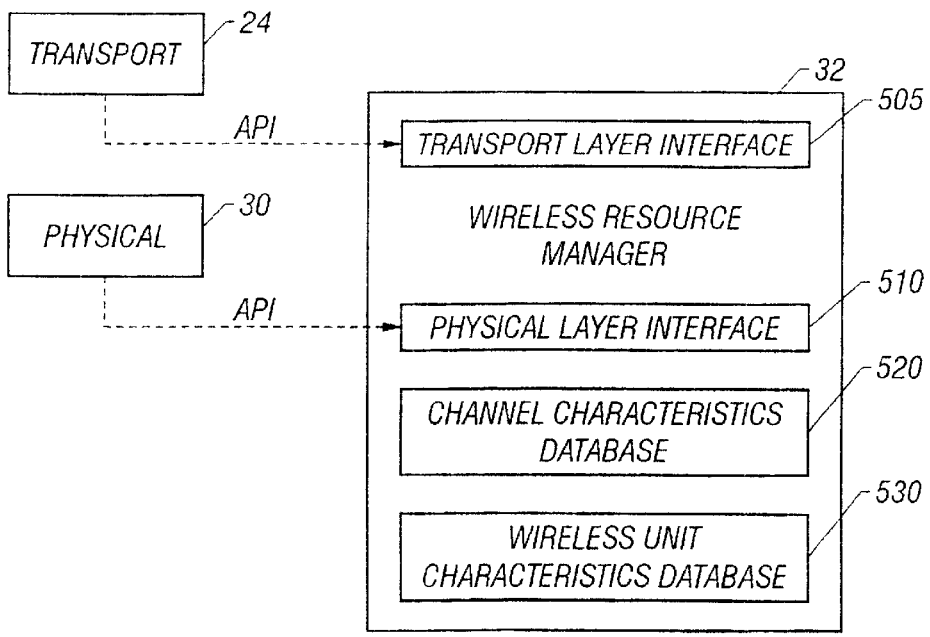
FIG. 8 is a wireless resource manager that operates in conjunction with the protocol stack of FIG. 3.

FIG. 8 is a functional block diagram of the wireless resource manager 32 of FIG. 3. The wireless resource manager 32 contains a transport layer interface 505, a physical layer interface 510, a channel characteristics database 520, and a wireless unit characteristics database 530. The transport layer interface 505 communicates through a well-defined application programming interface (API) of a transport mechanism of the transport layer 24 (shown in FIG. 3) of the ITP protocol. The interface 505 also communicates with the physical layer interface 510 according to the ITP protocol. The physical layer interface 510 allows the wireless resource manager 32 to actually communicate with a wireless network device (not shown) via a radio resource manager (RRM) within a wireless modem of such device. This communication also occurs through a well-defined API of the wireless network device to which the physical layer 30 can interact. The physical layer interface 510 allows the wireless resource manager 32 to request data from the wireless network device, such as, for example, channel status, channel characteristics, and other characteristics. This information may be relayed (see FIG. 3) to the transport layer 24 to allow the transport layer 24 to adapt to changing conditions in the wireless environment, as noted before.

The physical layer interface 510 also allows the wireless resource manager 32 to request that the wireless unit change its characteristics. For example, the wireless resource manager 32 may request that the attached wireless unit change the channel testing regime in the wireless device, so as to minimize the impact to the testing regime on the transmission of data. Or, the wireless resource manager may specifically request that the wireless device change channels. Of course, numerous other control and information mechanics are possible, as those skilled in the art will know and appreciate.

In addition to the interfaces 505, 510, the wireless resource manager 500 further includes the channel characteristics database 520. This channel characteristics database 520 is a database containing information on wireless receivers, the channels associated with them, and other information such as historical error rates, power characteristics, and other relevant information to the operation of the protocol in a wireless environment. The channel characteristics database 520 may also be adapted to contain information on cell phone relays, the facings of the relays, the channels associated with them, and other relevant information as noted above.

The wireless recourse manager 32 also includes the wireless unit characteristics database 530. The wireless unit characteristics database 530 is a database that contains information on the present operational characteristics of the wireless device employed in the transmission of the data. This can include such matters as the channel testing schedules, the allowable channels, the power associated with those channels, and other wireless device specific information aiding in the data protocol.

The usage of databases within the wireless resource manager 32 allows for monitoring of error statistics on an ongoing basis to develop "noise profiles" that allow the wireless resource manager 32 to make educated guesses about the duration and frequency of high error rate periods for a given RF channel. Each RF channel will exhibit its own noise profile, and the record of this profile is accumulated and stored by the IP protocol.

The wireless resource manager 32 utilizes the noise profile information to direct the transport layer 24 when the physical layer 30 has been acting unstable or unexpected. The information can also be requested by the transport layer 24 in order to determine the operational characteristics of the protocol, such as the proper FEC parameters or the proper timeouts to use. Unplanned channel events, such as channel changes generated external to the protocol, may also be communicated to the transport layer 24 in similar manner.

It should be noted that the wireless resource manager 32 may be implemented as an independent resource, or may exist in whole or in part within either the transport layer 24 or the physical layer 30 of a protocol stack.

Compression

Referring back to FIG. 3, in the ITP protocol, the transport protocol layer 24 contains a number of functional units, including a transport mechanism 122, a compression mechanism 124, a forward error correction (FEC) mechanism 126, a physical layer manager 128, and a data heuristic manager 129.

The compression mechanism 124 takes the data generated by the network device and compresses it. This compression mechanism 124 can utilize interchangeable compression techniques, adaptable to the actual data received. For example, the data may comprise graphical data. The transport layer 24 can recognize the data as graphical data, and implement a wavelet transformation on that graphical data. Or, the transport layer 24 may have a priori knowledge of the type of graphical data, and adaptively implement a wavelet transformation on the data with a set of basis functions that minimize the amount of data to be transported.

Forward Error Correction

The FEC mechanism 126 takes the compressed data, and adds an amount of extra data allowing the receiving mechanism to reconstruct the arriving data even in the case of a loss of the original data. The FEC mechanism 126 is adaptable to current conditions existing in its connection to and across the interconnected network 140.

In a typical FEC system, based upon a known error rate, a certain amount of extra data is generated and added to the transmission. For an amount of data K, an added amount of data L is generated such that the total data amount of K+L=N is actually sent. The retrieval of any amount K of the data at the receiver device is sufficient for the receiver device to recreate the data sent by the transmitting device. As the error rate of transmission rises and falls, the amount of data L may be dynamically altered to reflect the expected transmission loss.

Transport Mechanism

The transport mechanism 122 of the transport layer 24 directs the bundling or packetizing, and the rebuilding, of the original payload of digital data on the receiving end. The transport mechanism 122 also controls the computation of timeouts on the receiving end of the transmission. Additionally the transport mechanism 122 directs the flow of information between the receiving and transmitting ends through the use of control protocols. These control protocols include the indication of a payload received, the indication of an incomplete transmission of a payload, and other handshaking types of control mechanisms between the receiving and transmitting sides over the interconnected network 12.

The transport protocol on the receiving end can keep track of the amount of data not received. This data, when returned to the transmitting protocol, can enable the transmitting protocol to adapt to changing network environments, as noted further in the specification.

Additionally, in the case of a multi-path link to the interconnected network, the packets can be reorganized and prioritized. If, for example, the link to the interconnected network is across a wireless link, the high priority packets can be sent on a channel having a greater probability of getting through the link. Lower priority packets can be delayed, or sent over noisier channels.

Physical Layer Management

The physical layer manager mechanism 128 allows the transport layer 24 the ability to finetune the transmission and reception of data across the interconnected network 12 (shown in FIG. 2). The physical layer manager 128 monitors the physical layer 30, and provides the transport layer 24 knowledge of the state of the actual transmission of the payload or payloads in the physical layer 30.

Based upon the state of the physical layer 30, the transport layer 30 can slow transmission, cease transmission, alter correction parameters in the FEC mechanism 126, or other such actions. In the case of a wireless link, the interplay between the physical layer manager mechanism 128 and the transport mechanism 122, for example, allows the IP protocol 20 to send high priority packets over a more robust channel.

The ability to cease operations in the transport layer 24 is especially important, since the transport layer 24, when the physical layer is overloaded, can simply stop data from flowing through the protocol 20. The conventional protocols, in the case of physical delay, do not and cannot communicate this up the protocol stack. This makes buffer overruns in the upper levels of the conventional stack more prevalent, and can lead to drastic downturns in the speeds and efficiency of operation of the conventional protocols. As such, the physical layer manager mechanism 128 of the present embodiments allows for the minimization of buffer overruns and allows the protocol 20 to resume operation without a snowball delay through the protocol 20.

The physical layer manager mechanism 128 can also keep track of certain data pertaining to the transmission characteristics of the physical layer 30. In particular, the physical layer manager mechanism 128 allows for the keeping of error rates in the transmission based on receipts of transmissions from receiving protocols indicating the amount of data not received.

Data Heuristics

The data heuristic mechanism 129 of the ITP protocol 20 allows for the reconstruction of data on the receiving end, even when the minimal amount of data necessary in the FEC is not present. For example, in graphics data, the data may be representative of high energy and low energy portions. Should related high-energy data be recovered, a low energy data lost portion may be reconstructed in its absence solely from the high energy data. As noted, the data heuristic mechanism 129 is highly specific to the data sent.

As such, depending upon the particular data and, possibly the compression used on the data, the data heuristic mechanism 12a allows the transport layer 24 to assign priorities to individual packets. This, in turn, allows the transport mechanism 122 and the physical layer manager mechanism 128 to send high priority packets on more robust channels or paths.

More detailed description of data heuristics is provided after discussion of the general transmission and reception scheme, as follows.

Transmission Process

Figure 9:
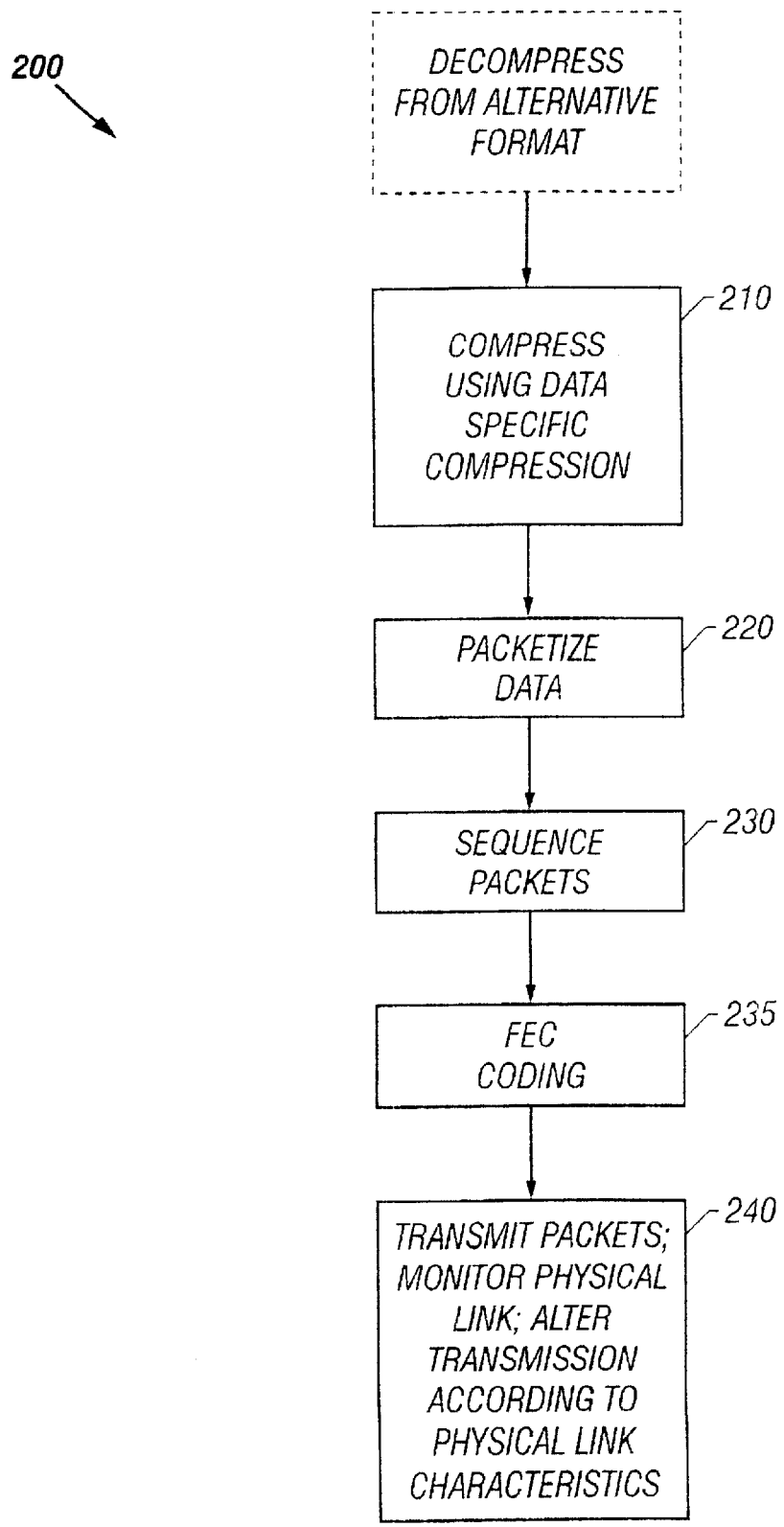
FIG. 9 is a flow diagram of a transmission procedure according to the protocols of embodiments of the present invention.

FIG. 9 is a flow diagram of an exemplary transmission of the payload 30 (shown in FIG. 4) of digital data that may be implemented in the ITP protocol 20 of FIG. 3. In a step 210, the data is compressed in an appropriate format. The compression scheme and characteristics are adaptable based on the data itself, as those skilled in the art will know and appreciate. For example, with image data, compression is best achieved in certain ways, whereas textured information data may best be compressed in other manners, and so forth. In a step 220, the data is packetized as the packets 40 (shown in FIG. 5) and readied for transport across an interconnected network 12 (shown in FIG. 2). In a step 230, the packets 40 are sequenced in priority. FEC coding is performed in a step 235.

In a step 240, the packets are sent by a transmitting device, such as, for example, the mobile wireless device 4 (shown in FIG. 2). Additionally, in the step 240, the protocol 20 monitors the physical link, that is, the particular wireless (or wired, as the case may be) communications channel of the transmission is monitored. The transmission of the packets 40 may then be delayed, or reordered, depending upon the parameters of the link as monitored, in order to optimize or assure satisfactory transmission results.

Figure 1:
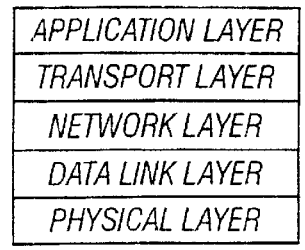
FIG. 1 is a prior art OSI model protocol stack.
Figure 10:
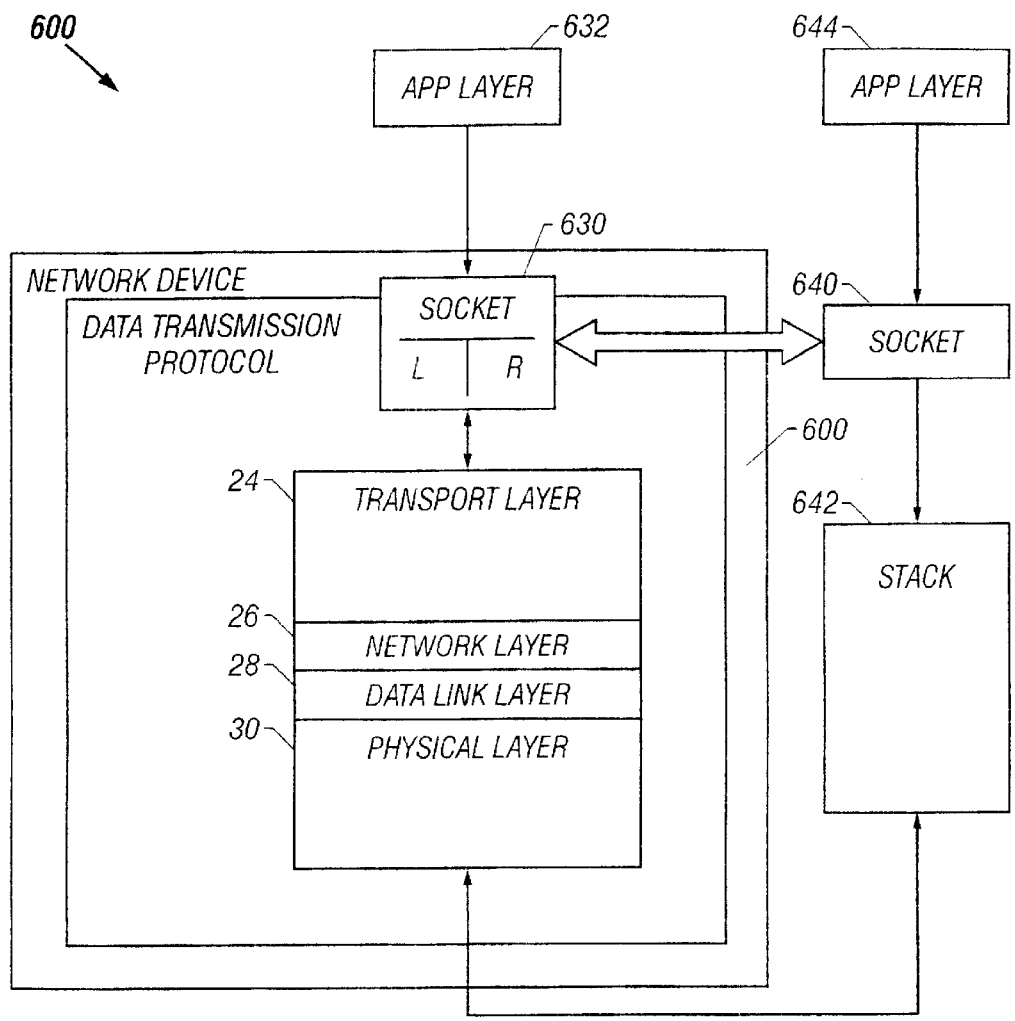
FIG. 10 is a block diagram of an exemplary physical connection between the transport layer and the physical layer of the protocol stack of FIG. 3, according to embodiments of the present invention.

FIG. 10 is a block diagram of an example of a possible physical connection transport layer 24 and the physical layer 30 for performing the protocol 20 of FIG. 1. In the example, a protocol stack 600, according to the ITP protocol 20 (shown in FIG. 3), includes a physical layer 30 and a transport layer 24. The communication between the transport layer 24 and the physical layer 30 is achieved, for example, by means of a pair of sockets 630 and 640. The socket 630 is opened to the transport layer 24. The socket 630 connects with an application layer 632, as is conventional. The socket 640 is opened to a stack 642, which stack 642 communicates with the physical layer 30. Also as is conventional, the socket 640 connects with an application layer 644. The sockets 630, 640 are in direct communication and can thereby allow coordination between the transport layer 24 and the physical layer 30 for occurrences and conditions in operations of the ITP protocol 20.

Upon initiation of the protocol 20, sockets 630, 640, respectively, are created in each of the transport layer 610 and the physical layer 620. Information about the physical layer 30, such as channel characteristics in the case of a wireless physical link, are communicated to the transport layer 24 via the sockets 630, 640 connection. Additionally, requests to alter the action of the physical layer 30, or requests about the physical layer 30, are communicated by the same sockets 630, 640 mechanism. In operation, if for some reason the physical layer 30 cannot keep up with the data throughput through the protocol stack 600, the physical layer 30 communicates this condition to the transport layer 24 through the communication set up by the sockets 630, 640 pair. The transport layer 24 may either maintain active communications with the physical layer 30, or a polling mechanism may be employed.

Conditions that the physical layer 30 may communicate to the transport layer 24 include (but are not limited to) such information as channel conditions, channel switches or hops, and other relevant information regarding the communication link between the wireless physical device 4 (shown in FIG. 2) and the interconnected network 12. Thus the transport layer 214 can use this information in managing data communications through the protocol stack 600. For example, should channel characteristics determine that a new channel is needed in a link between a wireless physical device 4 in the interconnected network 12, the physical layer 30 will communicate this action to the transport layer 24 through the sockets 630 and 640. In response, the transport layer 24 will slow data communication through the protocol stack 600 in order not to create an overflow condition in any of the input buffers contained in the other layers of the protocol stack 600.

Upon an improvement in the channel characteristics of the physical device, or upon completion of the channel switch, this event is communicated to the wireless protocol layer 610 via the same socket pair 630 and 640. Upon notification of this event, the transport protocol layer 610 re-enables or speeds up data transmission through the protocol stack 600.

As such, the present invention envisions a dynamic communication protocol stack. The transport protocol layer 610 responds to changing characteristics in the protocol stack 600 and in the physical transmission characteristics. As such, data thrashing within the protocol stack 600 can be minimized. As envisioned, the topmost layer in an interconnected network protocol stack will act as a transmission manager for the communication system.

Figure 11:
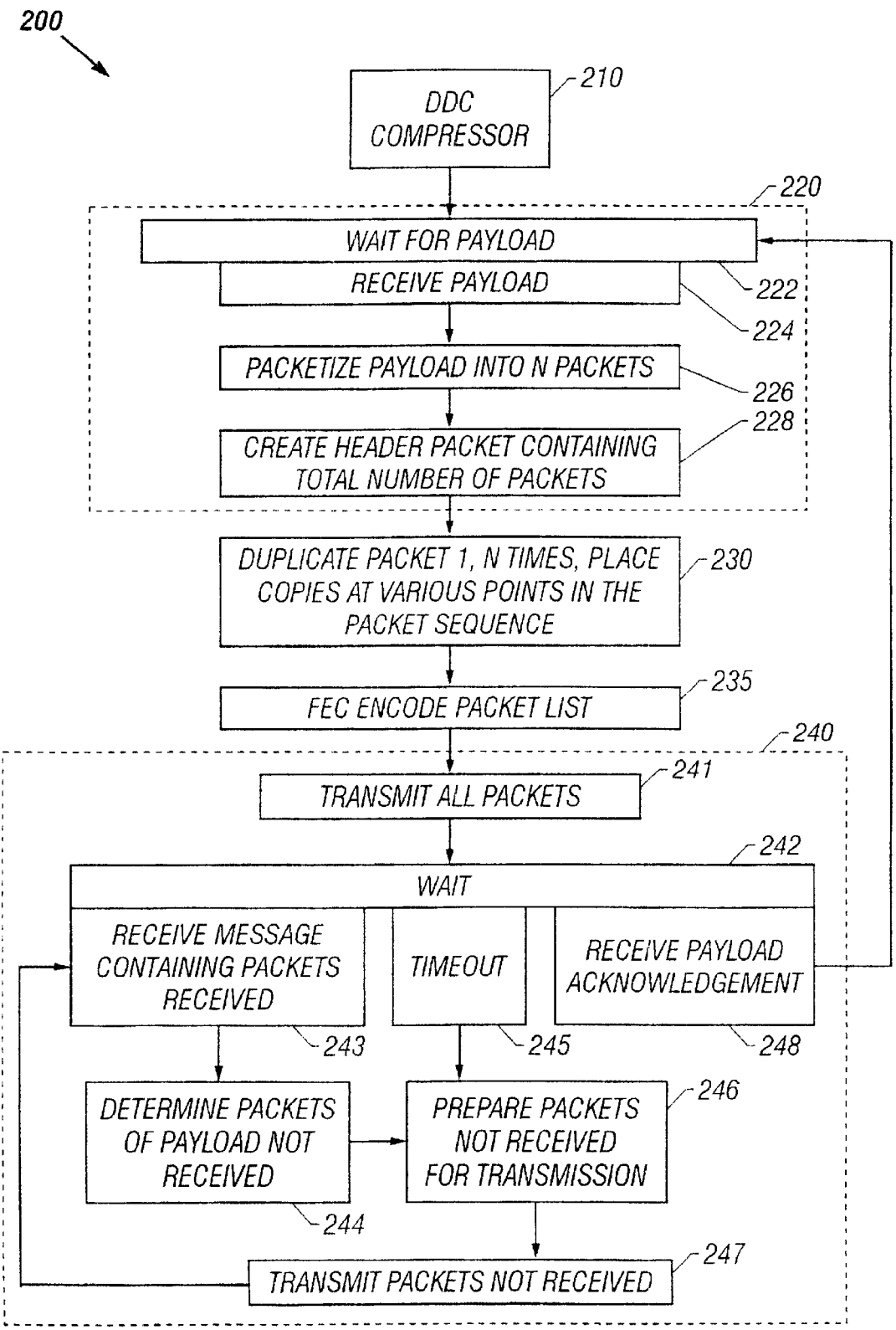
FIG. 11 is a flow diagram of the procedure of FIG. 9, further detailing the possible scenarios of operation in conjunction with a receiving protocol, according to embodiments of the present invention.

Referring to FIG. 11, the method 200 of FIG. 9 of transmission according to the protocol 23 is further detailed and described in various alternative scenarios. In particular, the method 200 commences with the step 210 of compressing data to be transmitted. Compressed data is then packetized in the step 220. The step 220 includes several substeps as follows.

In a step 222, the method 200 waits to receive the data payload. The method 200 receives the data payload in a step 224. The data of the payload is then packetized into N packets in a step 226. Thereafter, a header packet is created in a step 228. The header packet is then duplicated in a step 230 and inserted at the beginning, middle and towards the end of the series of packets of the payload.

Once the data is packetized in the step 220, and the packets are sequenced in the step 230, FEC coding is performed on the payload in a step 235. The packets are now ready for transmission, and a step 240 of transmitting the packets follows. A step 240 of the transmission includes various steps and, depending on the efficiency and completion of transmission, can proceed along three possible routes.

In each of the routes, the payload, having been packetized with header packets inserted, is transmitted in a step 241. After transmission in the step 241, a waiting period occurs at the transmitting device in a step 242. In the waiting period of the step 242, the transmitting device will conclude or be notified that the payload was either received or not.

If the receiving device received all packets of the payload, including at least one header packet, then the receiving device sends to the transmitting device in a step 248 an acknowledgement (ACK) that the payload was received. Thereafter, the method 200 returns to the step 220 and, particularly, the step 222 of waiting for the next payload.

If, on the other hand, the receiving device only received some of the packets transmitted in the step 241, and also at least one header packet, then a step 243 follows. In the step 243, the receiver device sends to the transmitter device a message designating which packets were received successfully. In a next step 244, the transmitting device, based on knowledge of the particular packets that have been received by the receiving device from the message of the step 243, determines which packets of the payload were not received. The transmitting device then prepares the packets that were not received for re-transmission in a step 246. In a step 247, the transmission device retransmits the packets not received by the receiving device. The method 200 then returns to the step 242 and waits to again conclude or learn by receipt message whether all packets have or have not been received successfully.

If the receiving device does not receive any header packet in the original transmission in the step 241 during the waiting period of the step 242, then a timeout occurs with the transmitting device not receiving any acknowledgement or other message from the receiving device. The timeout occurs in a step 245. After the timeout in the step 245, the transmitting device retransmits the entire payload, including the header packets, in the step 246 of preparing the packets for transmission. The entire payload and header packets are then retransmitted in the step 247. After the step 247, the transmitting device returns to the step 242 of waiting for acknowledgement or timeout.

As those skilled in the art will know and appreciate, the method 200 continues until the transmitting device concludes or learns by return message from the receiving device that the payload, together with at least one header packet, has been received by the receiving device. Even if the receiving device does not receive certain packets, the FEC coding of the packets in the step 235 can allow the receiving device, under certain circumstances, to reconstruct missing packets. In such instance, the receiving device can treat the situation as though the reconstructed packets were originally received, and thus notify the transmitting device with a message indicating the packages were received, although in fact reconstructed by FEC decoding.

Figure 12:
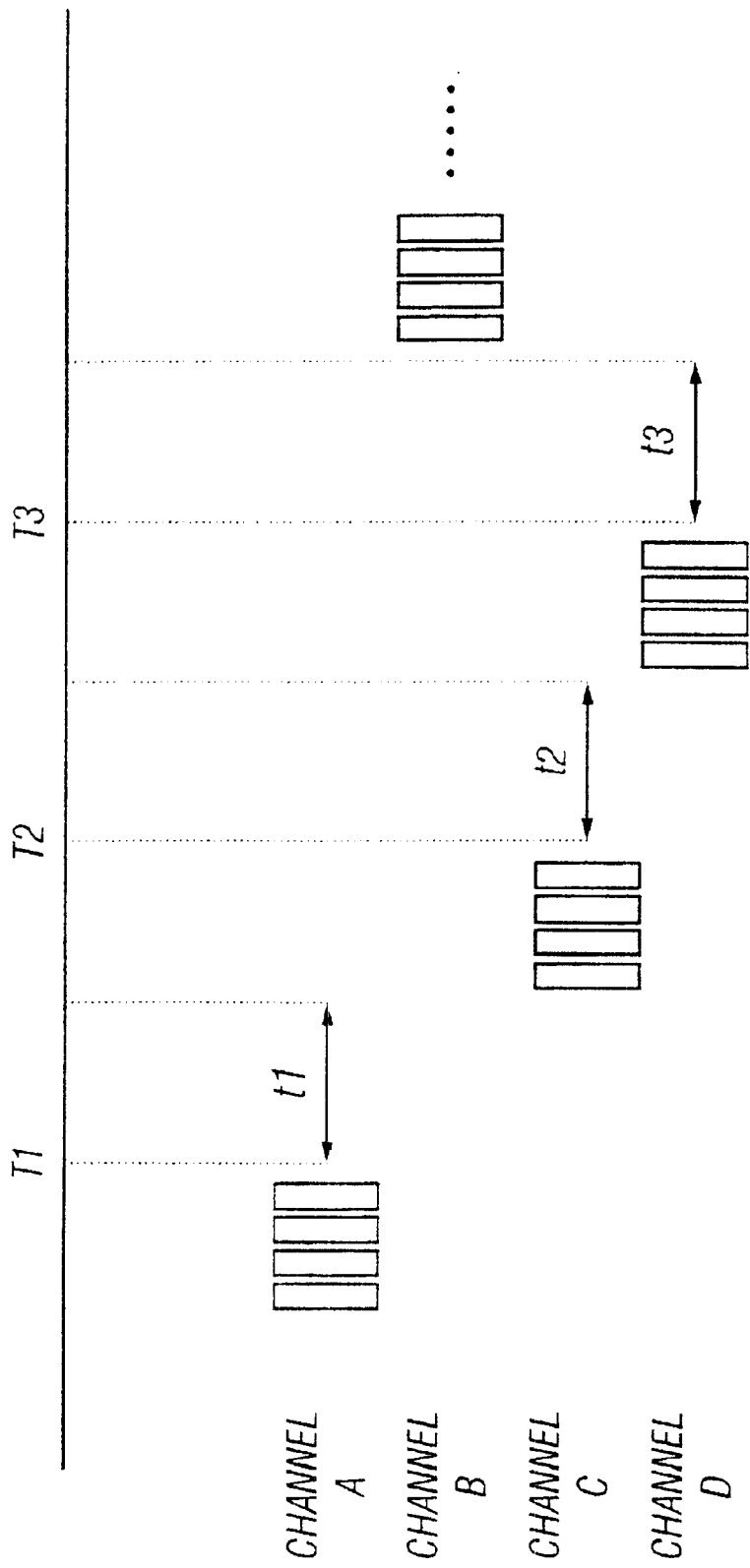
FIG. 12 is a timing diagram of a channel occurrence and operations of the embodiments of the present invention.

Referring to FIG. 12, in conjunction with FIG. 3, the situation of an unplanned network event, such as, for example, a communications channel interruption, is illustrated with a timing diagram of the unplanned event. The unplanned event in this example requires a channel change for the communication. First, at a time T1, the channel change takes place, interrupting the transmission of the data packets P on channel 1. This event is detected by the wireless resource manager 32 (shown in FIG. 3) of the protocol 20 (or, alternatively, by some other physical layer mechanism that performs similar function). The wireless resource manager 32 communicates to the transport layer 24 of the protocol 20 that the event has occurred. The channel change takes a time t1 to occur. Instead of continuing to transmit according to the protocol 20, which would possibly overflow underlying buffers in the protocol 20, the transport layer 24 of the protocol 20 ceases the transmission of data until notified by the wireless resource manager 32 of a successful channel change.

Only after the period t1, and once a new channel is implemented, does the transport layer 24 of the protocol 20 continue the process to send data to be transmitted. Channel changes are noted at times T2 and T3. In particular in the protocol 20, only after the successful channel change does the transport layer 24 again proceed to relay data for physical transport. Thus, via the protocol 20 and wireless resource manager 32 operation, avalanche failure of the entire protocol 20 is avoided, as well as the otherwise required reset time that would be associated with that failure.

Figure 13:
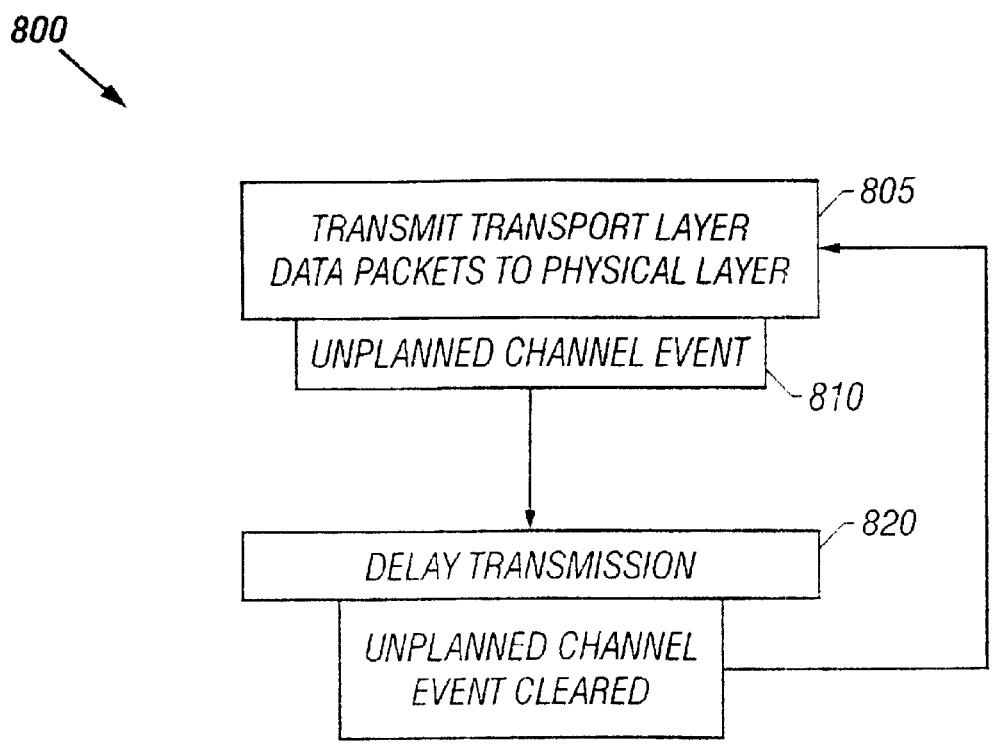
FIG. 13 is a flow diagram of the operations occuring in FIG. 12.

Referring to FIG. 13, a method 800 is performed in the circumstance of the unplanned event of FIG. 12. In a step 805, the transport layer of the protocol 20, in operation prior to the unplanned event, continues to relay the data packets transmission. In a step 810, the unplanned event, for example, requiring a channel change, takes place. Upon detection of this event, the transport layer 24 in a step 820 delays the subsequent transmission of any data, until the unplanned event is cleared in the step 820. Upon the clearing of the unplanned event, the normal transmission through operation of the protocol 20 resumes in the block 805.

Receiving Process

Figure 14A:
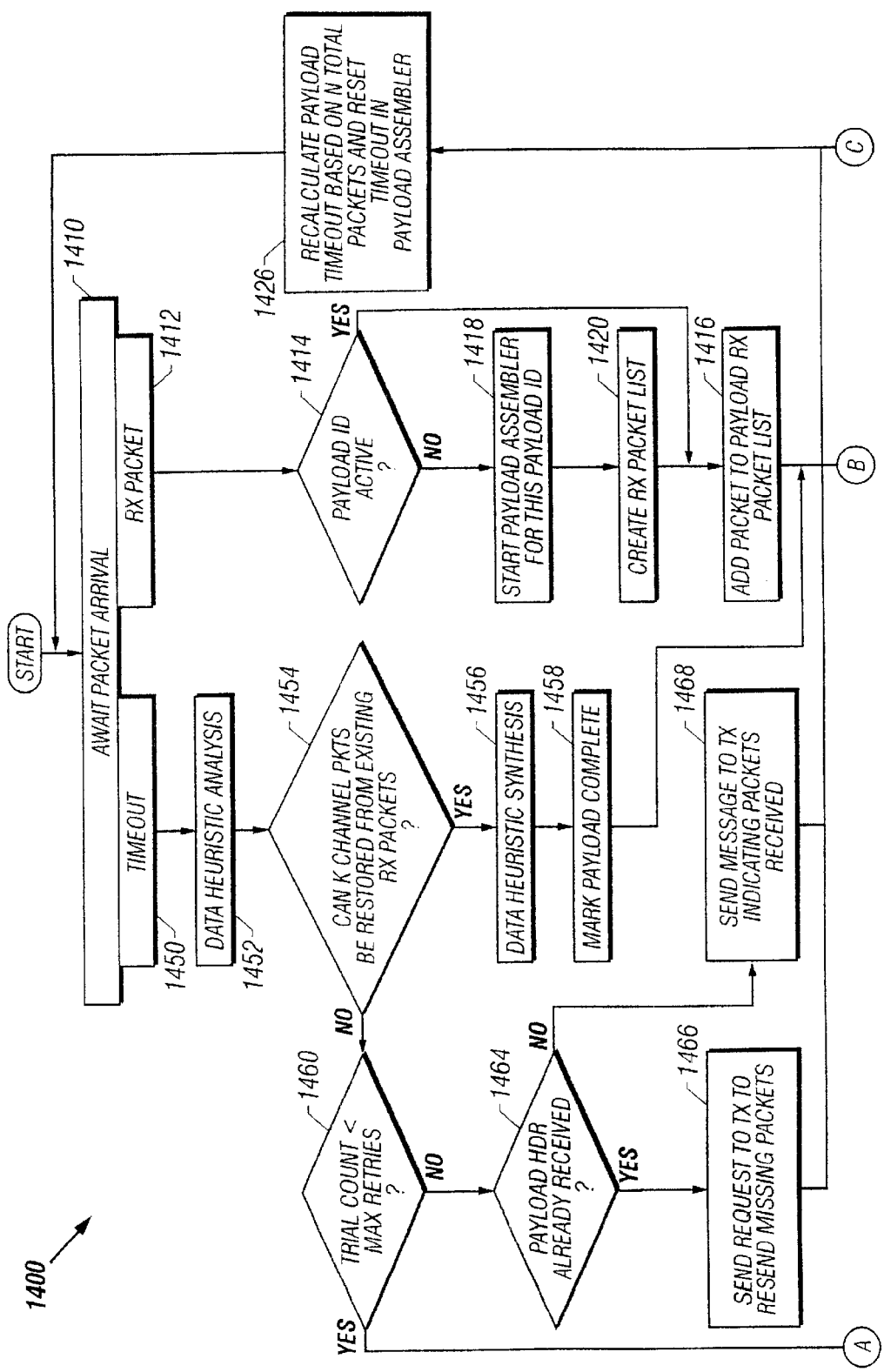
FIG. 14 is a flow diagram of a reception procedure according to the protocols of embodiments of the present invention.
Figure 14B:
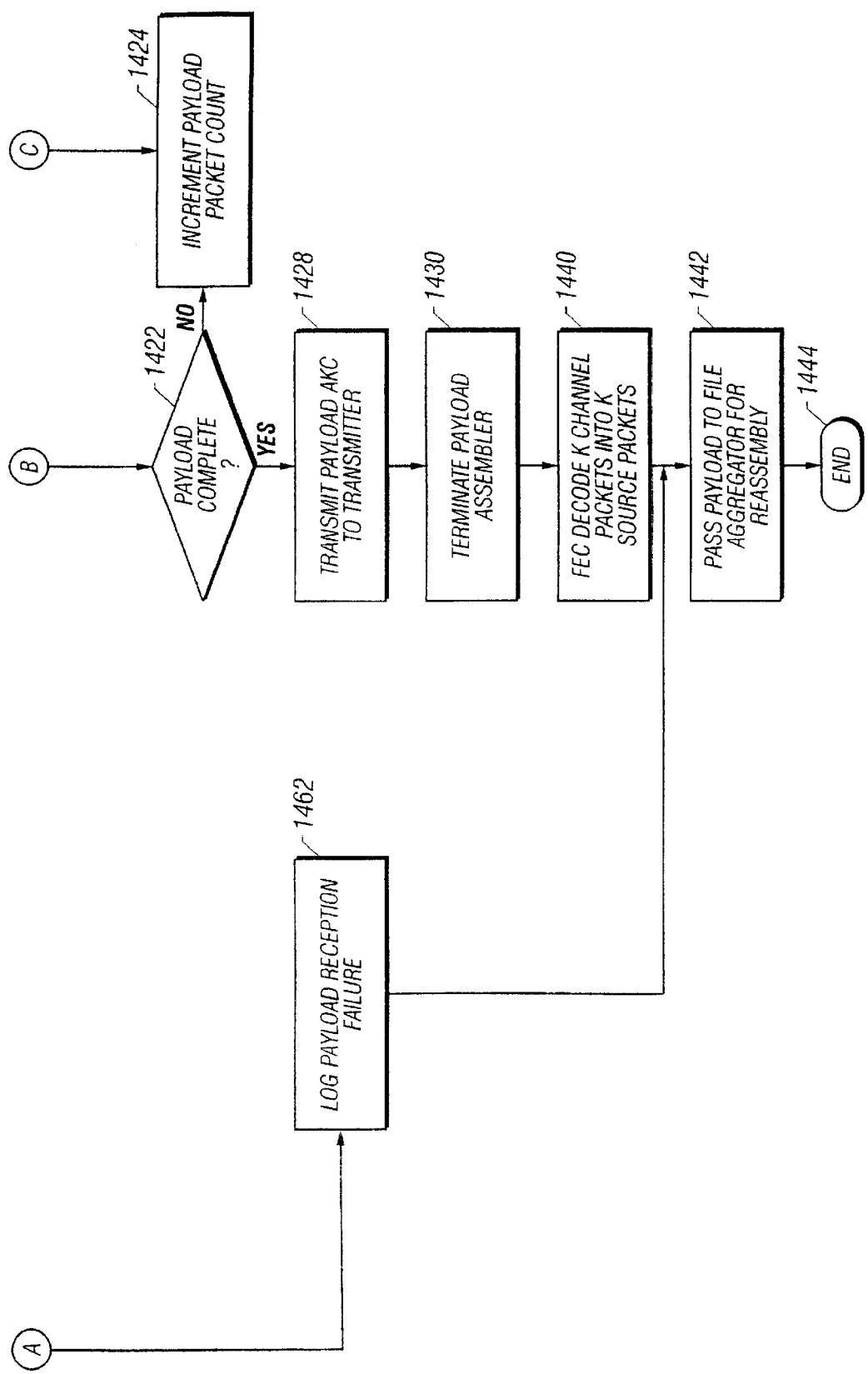

Referring to FIG. 14, a method 1400 of receiving transmitted information conforms to the protocol 20 (shown in FIG. 3). In a step 1410, the receiving device operating according to the protocol 20 waits for arrival of an initial packet of a payload transmitted to the receiving device. In a step 1412, a transmitted packet has arrived and is received by the receiving device. In a step 1414, a determination is made regarding the received packet of whether the payload ID of the packet is active. If the payload ID is active, i.e., a particular payload is indicated by the payload ID, then the received packet is accumulated with other arriving packets in a step 1416. If, on the other hand, the payload ID of the packet is not active, a step 1418 starts payload assembly for the payload ID.

Next, in a step 1420, a received packet list is created. The step 1416 of adding the packet to the payload received packet list then follows the step 1420.

In a step 1422, the method 1400 determines whether the payload received is complete. If it is not complete, then a step 1424 follows in which a payload packet count is incremented. Thereafter, a payload timeout is recalculated based on the total packets expected in the payload and the timeout is reset for payload assembly in a step 1426. The method 1400 then returns to the step 1410 of awaiting packet arrival.

If the payload is complete in the step 1422, a next step 1428 transmits a payload acknowledgement (ACK) to the transmitting device. In a step 1430, the payload assembler operation is terminated. If in the transmission process according to the method 200 (shown in FIGS. 9 and 11) the packets are FEC encoded, a step 1440 decodes the packets into the appropriate number of source packets. In a step 1442, the payload, as assembled and decoded, is passed to a file aggregator for reassembly. The reception method 1400 is completed with a step 1444 of ending the task.

Once a first packet has been received in the awaiting packet arrival step 1410, a step 1450 is commenced in which a timeout begins. The timeout in the step 1450 occurs as the method 1400 anticipates receipt of additional packets. If the step 1450 of timeout extends for the entire timeout period, then the method 1400 performs data heuristic analysis in a step 1452 to attempt to construct the nonreceived packets.

In a step 1454, the method 1400 determines whether the packets that were not received can be restored from the existing packets that were received. If the packets can be restored, then data heuristic synthesis is performed in a step 1456. Thereafter, the payload is marked complete in a step 1458. The method 1400 then proceeds to the step 1422 of determining whether the payload is complete. If in the step 1454 determination is made that the nonreceived packets cannot be restored by data heuristics, the method 1400 proceeds to a step 1460. In the step 1460, a determination is made whether a set maximum number of retries has been reached. If the maximum number of retries for receiving packets to complete the payload has been reached, a step 1462 follows in which a log is made that the payload reception has failed. In such instance, the incomplete payload is passed to the file aggregator for reassembly in the step 1442 and the method 1400 proceeds to end the task in the step 1444.

If, on the other hand, the maximum number of retries has not occurred as determined in the step 1460, a step 1464 determines whether any payload header packet has been received. If a payload header packet has been received, then a step 1466 sends requests to the transmitting device to resend the missing packets. If no header packet has been received, then, instead, a step 1468 follows in which the receiving device sends a message to the transmitting device indicating which packets were received. In each instance, the steps 1466 and 1468 are followed by a step 1426, in which the payload receipt timeout is recalculated and the timeout is reset in the payload assembler. The method 1400 returns to the step 1410 of awaiting packet arrival.

It should be noted that the receiving protocol could keep track of packets not physically received and communicate this back to the transmitting protocol as well. This would enhance the ability of the physical layer manager of the transmitting protocol to adapt to changing circumstances in the network. Thus, while the protocol could minimize retransmits by rebuilding a packet or approximating one, it would be useful to communicate the numbers of packets not received back to the originating protocol in order to fully allow the adaptive characteristics of the protocol to effectively operate.

Figure 15:
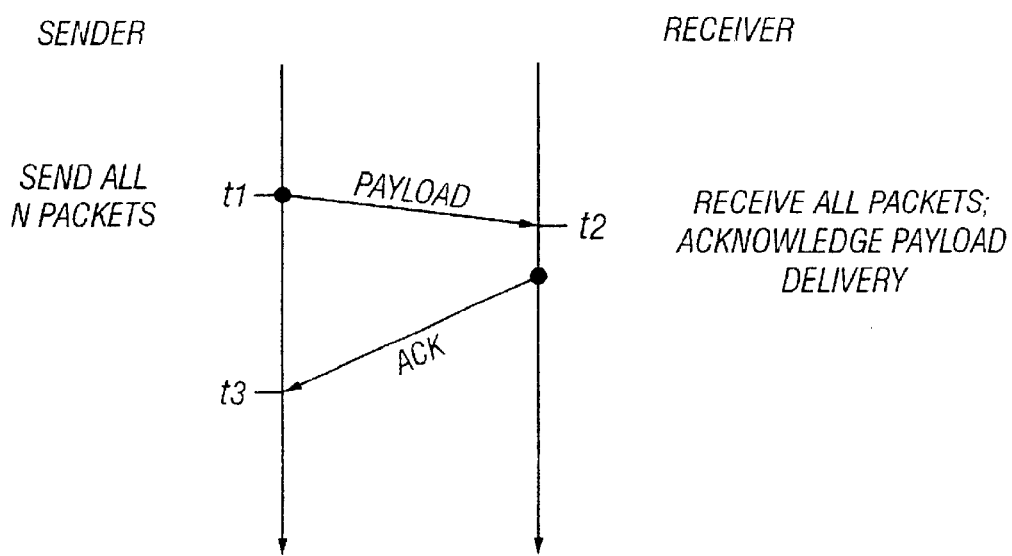
FIG. 15 is a timing diagram of a transmission and reception scenario, according to embodiments of the present invention.
Figure 16:
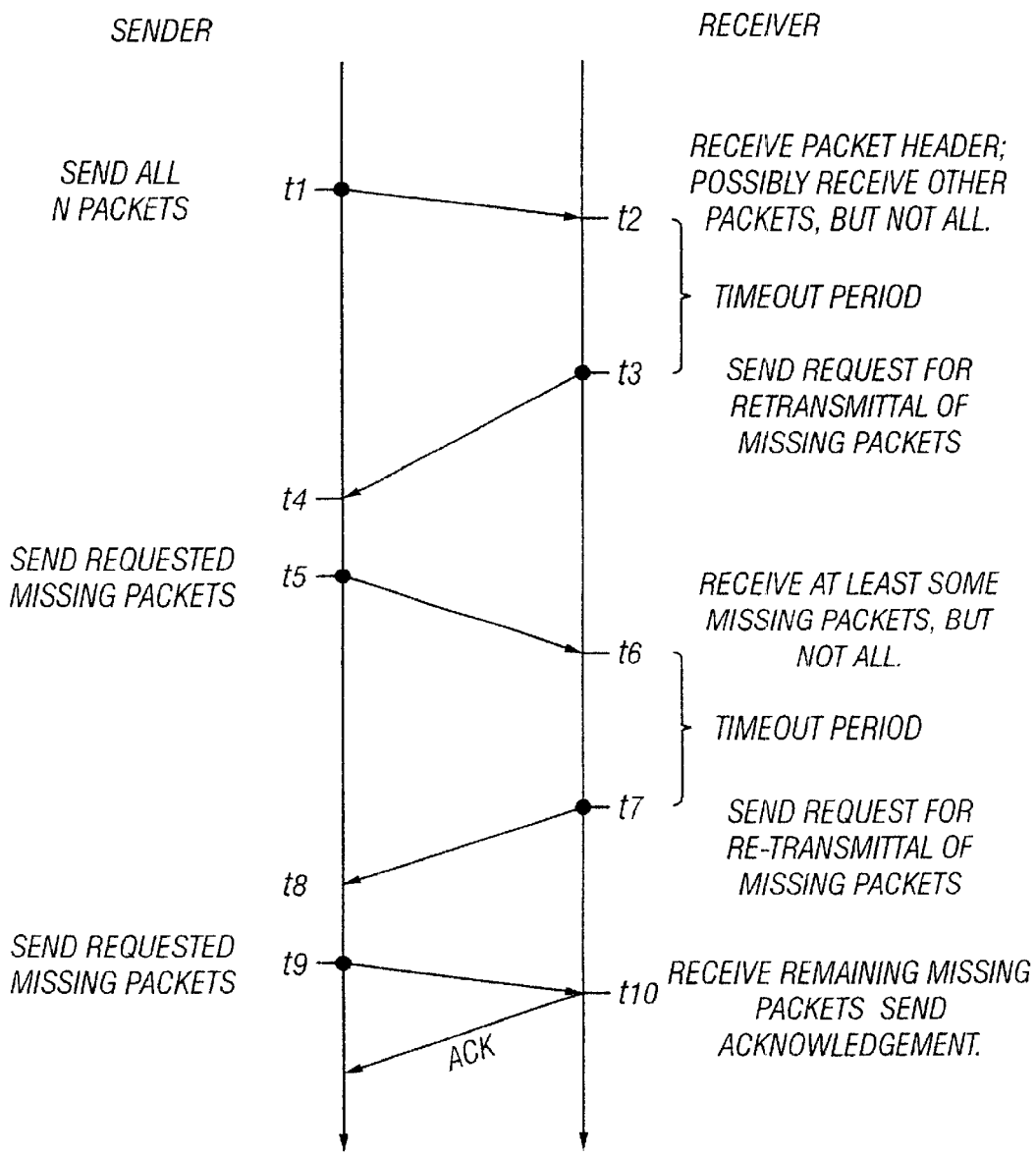
FIG. 16 is a timing diagram of another transmission and reception scenario, according to embodiments of the present invention.
Figure 17:
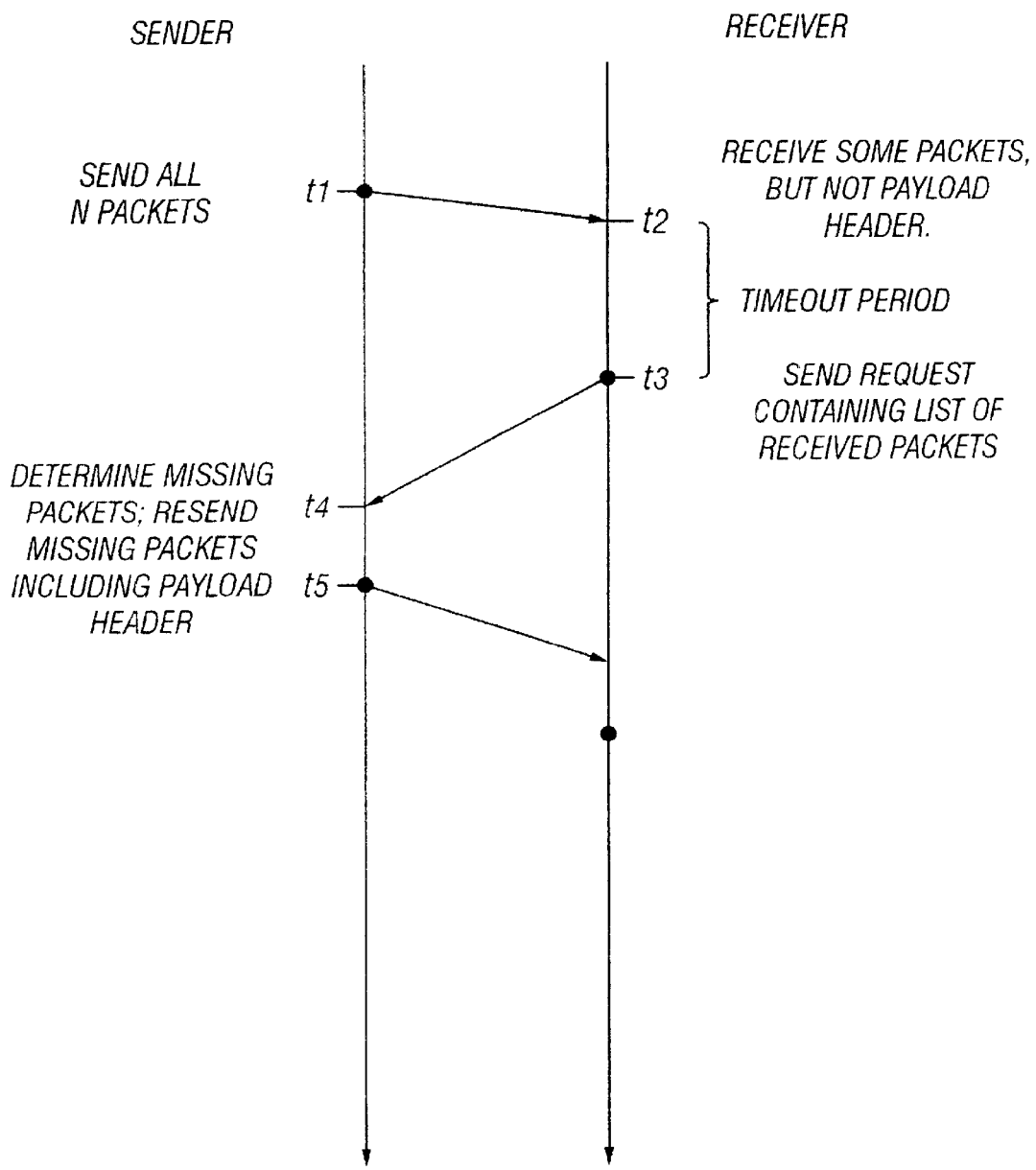
FIG. 17 is yet another timing diagram of another transmission and reception scenario, according to embodiments of the present invention.

FIGS. 15–17 are timing diagrams detailing exemplary interplay between transmitting and receiving according to the protocol 20 of FIG. 13. Referring to FIG. 15, a timeline shows one possible outcome of the communication transaction between the transmitting and receiving devices according to the protocol 20. At a time t1, the transmitting device, via the protocol 20, packetizes the payload buffer and sends the resulting packets through the interconnected network to the receiving device operating according to the protocol 20. In the time between t1 and t2, the receiving protocol receives a number of packets directed to it. At a time t2, the receiving protocol receives all the packets. At this time, the receiving protocol acknowledges the delivery of the payload.

Referring to FIG. 16, a timeline shows another possible outcome of a communication transaction between the transmitting and receiving devices employing the protocol 20. At a time t1, the transmitting device, via the protocol 20, packetizes the payload buffer and sends the resulting packets through the interconnected network to the receiving device operating according to the protocol 20. In the time between t1 and t2, the receiving protocol receives a number of packets directed to it by the transmitting device. However, in this case, the receiving protocol receives at least one header packet, but not all the packets of the payload sent by the transmitting protocol.

Upon arrival of a first packet of the payload, the receiving protocol initiates a timeout period. At the end of this timeout, time t3 in the diagram, if another packet has not been received, the receiving protocol sends a request for re-transmittal of only the missing packets. The protocol 20 determines which packets are missing based on knowledge of the packets actually received and based on the header packet which contains information detailing the contents of the payload and the packets which are being sent. At time t3, the header packet has been received by the receiving protocol. The information in the header packet contains the number of packets sent (and to be expected by the receiving protocol) in that particular payload.

The receiving protocol then determines the packets that have not arrived and need to be retransmitted by the sending protocol. The receiving protocol formulates a request for these missing packets and sends the request for retransmission of the specific missing packets to the transmitting device at the time t3. The request for retransmission of the missing packets is received by the sending protocol at a time t4. At time t5, the transmitting protocol retransmits the requested missing packets as requested by the receiving protocol.

At time t6, the receiving protocol has received at least some of the missing packets, but not all of them. At the receipt of any first ones of the missing packets, the receiving device initiates a timeout, as above. At time t7, the timeout period initiated by the receiving protocol has expired without all the missing packets having arrived. The receiving protocol then requests another retransmittal of the still missing packets at this time.

The re-transmission request is received by the transmitting protocol at time t8. The transmitting protocol then resends the requested missing packets at time t9. These missing packets are received at receiving protocol at a time t10.

The receiving protocol then sends an acknowledgment (ACK) of receipt of the complete payload at the time t10. This cycle of sending packets; the receiving protocol initiating a timeout on the arrival of a first of the packets; at the termination of the time out period, if a header packet has arrived, the receiving machine requesting a retransmission of the only the particular missing packets; and the resending of only the missing packets, is repeated until the entire data payload is delivered to the receiving device. Thus, the receiving device uses the information contained in the packet header to actively request the retransmission of only all the packets it has not received.

It should be noted that the receiving protocol can also attempt to rebuild the missing packets via the FEC implemented in the protocol. Or, the protocol can attempt to reconstruct certain data, such as graphical data, through the use of data heuristics.

Referring to FIG. 17, another timeline example is provided of a circumstance of operation of the protocol 20 of FIG. 3. At a time t1, the transmitting protocol has formatted and packetized the payload data for communication over the interconnected network to receiving protocol. The packets are sent by time t1 to the receiving protocol.

When the receiving protocol receives a first of the packets of the payload, the receiving protocol initiates a timeout period. If another packet arrives within in this timeout period of time, the receiving protocol reinitiates the timeout period. Once a timeout has expired without an incoming packet being received, the receiving protocol attempts to determine if the entire data payload has been received. At time t2, the receiving protocol has received a packet and initiated a timeout period. At time t3, the receiving protocol has timed out without receiving a header packet. As such, the receiving protocol can not determine the number of packets to expect for the particular payload and can not know which packets were not received in order to request retransmittal of the missing packets from the transmitting protocol. However, the receiving protocol initiates a request to the transmitting protocol indicating that it has not received a packet header for the particular payload, and sends along with the request identifying information on the packets that it has received.

At time t4, the transmitting protocol has received the request from the receiving protocol indicating it has not received all the packets for the particular payload and that the receiving protocol did not receive the packet header for that payload. The transmitting protocol uses the identifying information regarding the packets received by the receiving protocol, and determines which packets to resend to the receiving protocol. The transmitting protocol then proceeds to again send the missing packets to the receiving protocol in the period between t4 and t5.

As shown in FIGS. 15–17, the reception of at least one packet by the receiving protocol initiates a timeout period. If the receiving protocol determines that it is missing packets, it then requests that the transmitting protocol retransmit those missing packets. If the receiving protocol has received a packet header, it can use the information contained in the packet header to specifically request retransmission of only the missing packets. If the receiving protocol has not received a packet header, it determines that it has not received all the pertinent data and the receiving protocol then requests a retransmittal of the packet header. Within the request, the receiving protocol also lists the packets it has received, so that the transmitting protocol may retransmit only those data packets, together with the header packet, that have not been received.

It should be noted that, unlike previous data protocols, the timeout values in the present invention are dynamic in nature. The communication between the transport protocol layer and the physical layer allows the protocol to dynamically deduce a proper timeout based on a history of the transmission of the data. In the case of a wireless link, the characteristics of the channel, the characteristics of the receiving and the transmitting device, and the actual times of previous, but close in time, transmissions of data, allow the protocol to set efficient timeouts.

An exemplary timeout of the receiving protocol is dynamic in nature, especially in the case where the link to the interconnected network is wireless. In this case, a more efficient timeout based on the wireless link characteristics can be computed. Again, the interplay of the physical layer manager and the transport mechanism in the protocol allow this to operate in an efficient manner. The transport mechanism contains a timeout, allowing a receiving protocol to efficiently determine when to send a message to a transmitting protocol requesting a retransmittal of data.

The timeout metric is computed and monitored by a receiving protocol, and tells the receiving protocol how long to wait for all the packets in a payload to arrive before assuming that any are lost and requesting a retransmission. The metric can be thought of as the weighted sum of the average or steady state network performance delay and the instantaneous delay effects caused by the current condition of a wireless link.

As such, in this exemplary embodiment, the timeout for a payload can be expressed in an environment as follows:

$$T_{bursttimeout} = W_{static} \cdot \hat{T}_{bursttimeout} + W_{dynamic} \cdot f(x, \ldots),$$

where $\hat{T}_{bursttimeout}$=Static burst delay calculation, and $f(x, \ldots)$=Instantaneous transmission delay effects, and $W_{static}$=Weighting of static delay approximation effects, and $W_{dynamic}$=Weighting of instantaneous delay effects, and $W_{static} + W_{dynamic} = 1$.

Since the total transmission time of a payload is contingent upon the size of a payload, and the header packet is not guaranteed to be the first one received, when a nonheader packet arrives, the size of the current payload is assumed to be the size of the last successfully transmitted payload. Upon the receipt of a header packet, and thus information regarding the size of the payload, the timing metric can be recalculated more closely. When no payload has previously been received, a bootstrap default value can be used.

In a dynamic environment, the variances of the average transmission delay may be thought of as related to the weights W above. The greater the variance in a dynamic environment, the greater the instantaneous effects to the overall packet delay. In a wireline environment, $W_{dynamic}$ is close to zero.

In this exemplary embodiment, $\hat{T}_{bursttimeout}$ is based on $$\hat{T}_{bursttimeout} = E_{ppt}(x) \cdot N_{tpkts} + 2 \cdot \sqrt{N_{tpkts}} \cdot \sigma_{ppt}(x),$$

where $E_{ppt}(x)$=expected or average value of per packet transmission delay, and $\sigma_{ppt}(x)$=standard deviation of per packet transmission delay, and $N_{tpkts}$=Total number of packets expected in the next burst of packets. $E_{ppt}(x)$ and $\sigma_{ppt}(x)$ are computed from past payload receive performance.

For each payload that is received, and for each aborted payload, the total experienced accumulation time is divided by the number of receive packets in the payload to arrive at a delay per packet statistic for the payload. The standard deviation is also computed accordingly. These figures are recorded as part of the transport protocol. The average per packet transmission time is computed as the moving average over the actual last M delay per packet statistics experienced and stored again as part of the transport protocol.

Instantaneous wireless effects include many things, including geography, cell to cell variations in a cell phone network, and others. As such, the function $f(x, \ldots)$ is network specific and is different on all network links. The function is a weighted sum of delay contributions from the various sources of instantaneous delay. One or more persistent mechanisms are typically embedded within the transport protocol to monitor the delays of each of these sources. The individual functions can be hardcoded based on empirical evidence with a specific network, but they can alternatively be tuned or derived in an automated fashion, in real time or otherwise.

Referring to FIGS. 18*a–c*, block diagrams show an exemplary result of the interaction between the transport mechanism and the data heuristic mechanism. FIG. 18*a* shows a payload in its constituent packets. The packets are numbered in FIG. 18*a* according to the order in which the payload would typically be split via the transport mechanism of the protocol 20 (shown in FIG. 3). The packets are prioritized by the heuristic mechanism based upon the relative importance of the data carried by the packet.

In a typical compression, especially of graphical data, the lower frequencies or lower energies may be reconstructed from related, higher energy coefficients. Thus during the compression, the coefficients of the data are assigned a relative priority, based upon the content of the data. The more easily approximated or reproduced data is assigned a lower grade than the harder to reproduce data.

Thus, in FIG. 18a, the more important or higher weighted packets are packet 0 and packet N-1. The next most important is packet N, and so on until the least important data packet, packet 2. The data heuristic codes the packets in a manner consistent with the importance of the data contained therein.

In FIG. 18b, the transport mechanism has reordered the packets according to the relative weights of the data contained in them. Thus, the packet N-1 has been moved into the second slot. A renumbering of the packets may also occur, in order to allow the receiving protocol to more fully assess the importance of the information. Also, the original numbering order of the packets may be retained.

In FIG. 18b, the contents of packet N-1 have been interchanged with the contents of packet 1. Thus, the new packet 1 is equal to or less important to the packet 0, and is equal to or more important than packet 2. However, an internal field of packet 1 signifies that the natural ordering of the packet is still in the N-1th place. This allows the first ordering of packets to be preserved, if necessary.

Referring to FIG. 18c, the block diagram indicates ordering of the packets of FIGS. 18a–b as received at the receiving protocol. During the course of attempting to reconstruct the payload, the receiving protocol has correctly deduced that packet N-3 as sent, originally packet 1, is missing. The protocol uses the reordering of the packets to determine that the packet N-3, as sent, is no better than a "D" importance in the reconstruction of the payload. Thus, the protocol easily determines that the loss of the packet N-3 is acceptable to the reconstruction of the final payload. Notice also that the payload may also be assembled in the original order of FIG. 18a, since the original payload indices are still present in the data.

This ordering of the importance of the data contained in the packet also aids the efficiency of the physical transmission of the packets. The transport protocol can contain a means to prioritize the sending of important packets over transmission channels having good characteristics. Thus, if during the course of transmitting the packets a sudden condition causes the transmission channel to degrade, the transport protocol layer can redirect the less important packets to be transmitted, thus waiting for a clear channel to transmit the more important data.

Figure 19:
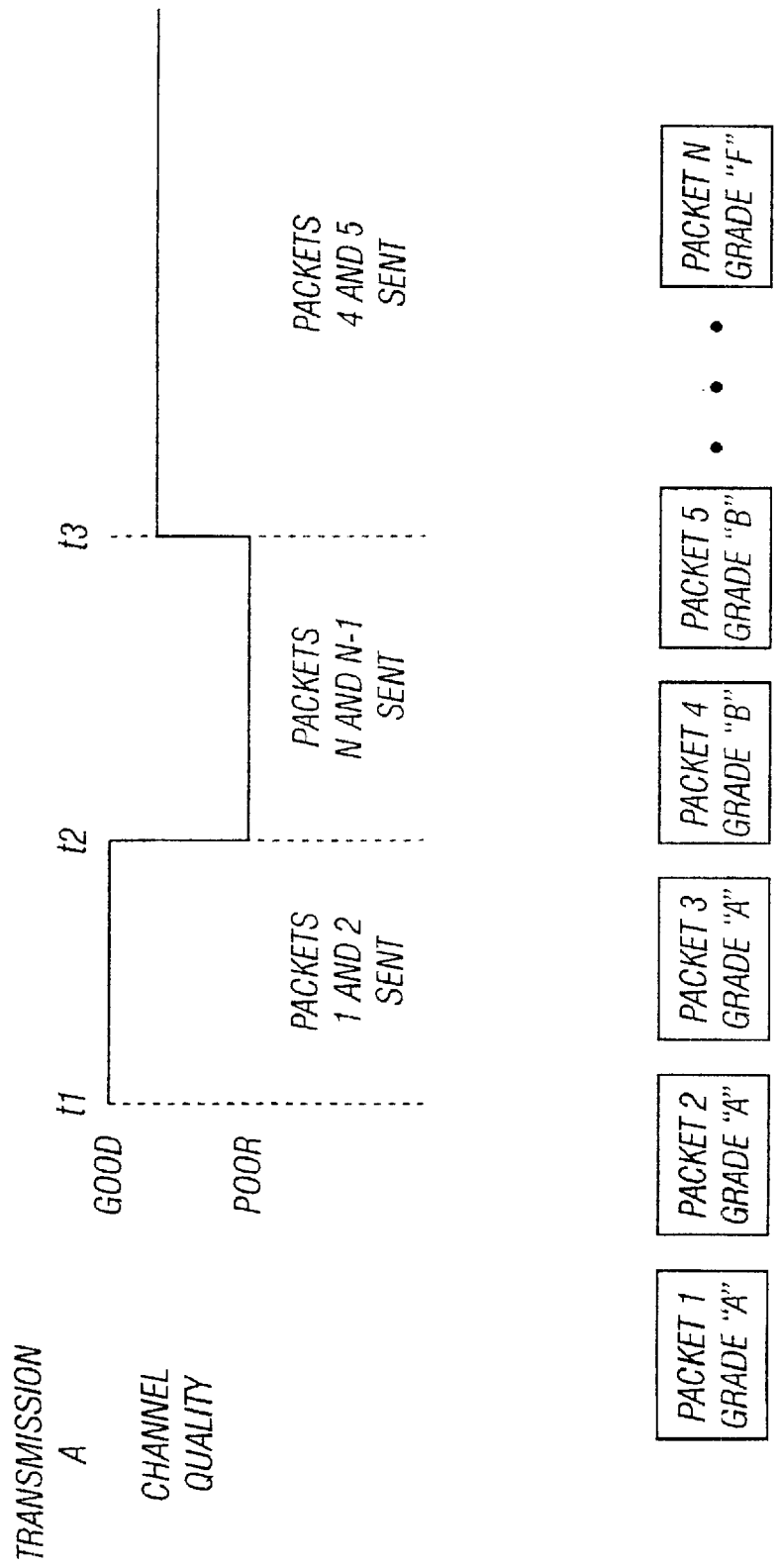
FIG. 19 is a timing diagram of an exemplary interplay between a data heuristic mechanism, a transport mechanism and the wireless resource manage of FIG. 8, according to embodiments of the present invention.

Referring to FIG. 19, a timing diagram shows an exemplary interplay between the data heuristic, the transport mechanism, and the physical layer manager of the protocol 20 (shown in FIG. 3). First, a transmission A is enabled at a time t1, and has good transmission characteristics, as indicated by the high level in FIG. 19. As such, the transport mechanism directs that the higher priority packets, as determined by the data heuristic mechanism, be sent during this time. Accordingly the highest priority packets, the packets 1 and 2, are sent in this time.

Suddenly, at a time t2, the channel characteristics for the transmission change to a low quality, as indicated by the low level in FIG. 19. The physical layer manager indicates this change to the transport mechanism. The transport mechanism then disables the transmission of any more high priority packets over the channel. This is because one would want the high priority packets to enjoy a greater probability of being received by the receiving protocol. As such, based on the low transmission quality, the transport mechanism directs that the lowest importance packets are to be sent at this time. Thus, the packet N is sent in this period.

At a time t3, the channel characteristics clear, but not to the best as at time t1. This change is indicated to the transport mechanism by the physical layer manager in the protocol 20. Since the transport characteristics have improved, the transport protocol enables the sending of the higher importance packets. Alternatively, the transport protocol can wait until the optimum conditions are met, like at t1. Then the transport mechanism can direct the transmission of intermediate importance packets, such as packet 5. Many different schemes can be envisioned for the interplay between the prioritization of packets and the transmission of them based upon the existence of good channel characteristics.

The current scheme can easily be extended to a plurality of channels. Since the physical layer manager contains a database of the different channel characteristics, the sending of priority packets may be delayed while the transport protocol waits for a better channel, rather than better channel conditions. Of course, other alternatives are possible.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A method of communications over a network, comprising the steps of:

packetizing a payload into a series of data packets;

inserting a header at the beginning, middle, and towards the end of the series;

transmitting the series, together with the header;

receiving at least some of the data packets of the series and the header; and sending an acknowledgement selected from the group consisting of: all data packets and the header received; not all data packets received and the header received; and some data packets received, but the header not received;

wherein the method further comprises the steps of:

identifying the data packets not received if the header is received but not all the data packets are received; and wherein the acknowledgement of the step of sending includes identifiers of the data packets not received; and re-transmitting only the data packets not received.

2. A method of communications over a network, comprising the steps of:

packetizing a payload into a series of data packets;

inserting a header at the beginning, middle, and towards the end of the series;

transmitting the series, together with the header:

receiving at least some of the data packets of the series and the header; and sending an acknowledgement selected from the group consisting of: all data packets and the header received; not all data packets received and the header received; and some data packets received, but the header not received;

wherein the method further comprises the steps of:
identifying that some data packets, but not any header, is received; and wherein the acknowledgement of the step of sending includes identifiers of the data packets received;

determining which data packets were not received, based on the identifiers in the acknowledgement;

re-transmitting only the header and the data packets not received.

* * * * *